US012048911B2

(12) United States Patent
Clifford et al.

(10) Patent No.: US 12,048,911 B2
(45) Date of Patent: Jul. 30, 2024

(54) STRUCTURED PACKING AND CROSSFLOW CONTACTOR EMPLOYING SAME

(71) Applicant: Koch-Glitsch, LP, Wichita, KS (US)

(72) Inventors: Scott Clifford, Wichita, KS (US); Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 17/840,372

(22) Filed: Jun. 14, 2022

(65) Prior Publication Data

US 2022/0395806 A1 Dec. 15, 2022

Related U.S. Application Data

(60) Provisional application No. 63/210,458, filed on Jun. 14, 2021.

(51) Int. Cl.
*B01J 19/32* (2006.01)

(52) U.S. Cl.
CPC ........ *B01J 19/32* (2013.01); *B01J 2219/3085* (2013.01); *B01J 2219/32217* (2013.01); *B01J 2219/3222* (2013.01); *B01J 2219/32227* (2013.01); *B01J 2219/32244* (2013.01); *B01J 2219/32272* (2013.01); *B01J 2219/3284* (2013.01)

(58) Field of Classification Search
CPC ................ B01J 19/32; B01J 2219/3085; B01J 2219/32217; B01J 2219/3222; B01J 2219/32227; B01J 2219/32244; B01J 2219/32272; B01J 2219/3284
USPC ...................................................... 261/112.2
See application file for complete search history.

(56) References Cited

U.S. PATENT DOCUMENTS

| | | | | |
|---|---|---|---|---|
| 3,947,532 A | * | 3/1976 | Skold | F28F 25/087 261/DIG. 11 |
| 4,518,544 A | | 5/1985 | Carter et al. | |
| 5,143,658 A | * | 9/1992 | Thomas | F28F 25/087 261/112.2 |
| 5,188,773 A | * | 2/1993 | Chen | B01J 19/32 422/256 |
| 5,320,651 A | * | 6/1994 | Drummond | B01J 19/32 55/440 |
| 5,413,741 A | * | 5/1995 | Buchholz | F28F 25/087 261/112.2 |
| 7,160,362 B2 | * | 1/2007 | Terada | F24F 3/14 34/80 |

(Continued)

OTHER PUBLICATIONS

"Structured Packing Brochure : PDF : Distillation : Chemical Process Engineering", Koch-Glitsch, Retrieved from the Internet URL: "https://www.scribd.com/document/455826" target="_blank" https://www.scribd.com/document/455826/a, 2015, pp. 1-12.

(Continued)

*Primary Examiner* — Charles S Bushey

(57) ABSTRACT

A structured packing module for crossflow applications is provided and includes a plurality of corrugated structured packing sheets positioned in an upright, parallel relationship to each other. The corrugations of adjacent structured packing sheets are in contact with each other and extend at a crossing angle. Apertures and raised ridges may be positioned on sidewalls of the corrugations. The structured packing module may be used in a crossflow contactor, such as in a process for removing carbon dioxide from air.

19 Claims, 16 Drawing Sheets

(56) References Cited

U.S. PATENT DOCUMENTS

| | | | |
|---|---|---|---|
| 8,715,398 B2 * | 5/2014 | Ausner | B01J 19/32 |
| | | | 96/290 |
| 11,014,064 B2 | 5/2021 | Clifford et al. | |
| 2005/0051916 A1 * | 3/2005 | Kinder | F28F 25/087 |
| | | | 261/DIG. 11 |
| 2010/0159209 A1 * | 6/2010 | Mockry | F28F 25/087 |
| | | | 428/184 |
| 2012/0248635 A1 | 10/2012 | Wolf et al. | |
| 2018/0353927 A1 | 12/2018 | Nieuwoudt et al. | |

OTHER PUBLICATIONS

International Search Report and Written Opinion received for PCT Application No. PCT/IB2022/055516, mailed on Nov. 8, 2022, 12 pages.

* cited by examiner

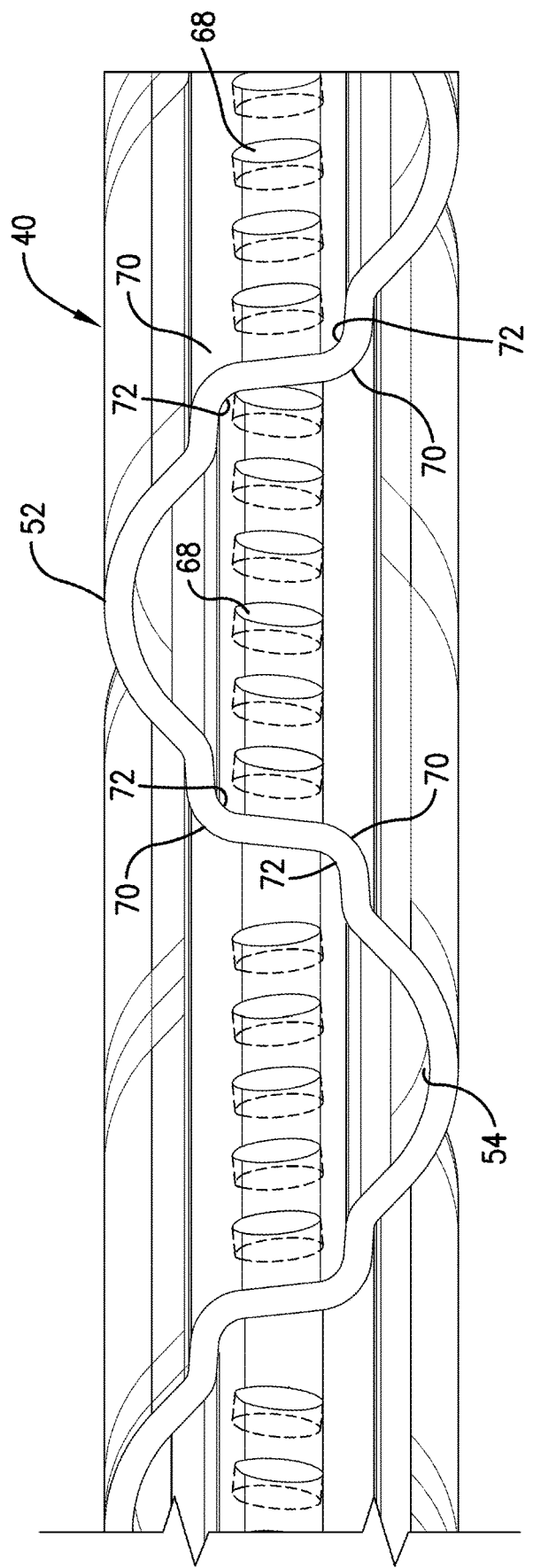

STRUCTURED PACKING AND CROSSFLOW CONTACTOR EMPLOYING SAME

RELATED APPLICATIONS

The present application claims priority to U.S. Provisional Application No. 63/210,458 filed on Jun. 14, 2021 which is incorporated by reference in its entirety.

BACKGROUND

The present invention generally relates to mass transfer and, more particularly, to structured packing used for facilitating mass transfer between fluid streams and to a cross flow contactor employing the structured packing.

Mass transfer columns are configured to contact at least two fluid streams in order to provide product streams of specific composition and/or temperature. The term "mass transfer column" as used herein is intended to encompass cross flow liquid-vapor contactors, absorbers, separators, distillation columns, divided wall columns, liquid-liquid extractors, scrubbers, and evaporators, which facilitate heat and/or mass transfer between two or more fluid phases. Some mass transfer columns, such as those used in multi-component absorption and distillation, are configured to contact gas and liquid phases, while other mass transfer columns, like extractors, are configured to contact two liquid phases of differing density.

Structured packings are commonly used in mass transfer columns to provide surfaces on which the different fluid streams may spread and interact with each other to cause mass transfer in which one or more components of one of the fluid streams is transferred to the other fluid stream and/or to cause heat transfer between the fluid streams. These structured packings typically comprise a plurality of structured packings sheets that are positioned in an upright, parallel relationship to each other. One type of structured packing sheet has corrugations, with the corrugations on adjacent structured packing sheets being arranged in crossing relationship to each other to form flow channels for one of the fluid streams. The other fluid stream may flow in crossing relationship, i.e., crossflow, or countercurrent flow to the fluid stream flowing along the flow channels formed by the crossing corrugations.

It is generally desirable to maximize mass and energy transfer between the fluid steams as they flow through the structured packing by increasing the specific surface area on which the fluids streams interact. However, increases in specific surface area generally result in an increase in pressure drop, which is undesirable in view of the capital and operational costs that are associated with creating sufficient pressure to overcome the pressure drop. As a result, a need exists for improved structured packings that achieve a lower pressure drop without sacrificing efficiency or that achieve increased efficiency without significantly increasing the pressure drop.

SUMMARY

In one aspect, the present invention is directed to a structured packing module comprising a plurality of structured packing sheets positioned in an upright, parallel relationship to each other, with each structured packing sheet having opposite ends, a top edge, a bottom edge, corrugations formed of alternating peaks and valleys and corrugation sidewalls that extend between adjacent ones of the peaks and valleys, and apertures in the corrugations for allowing passage of fluid through the structured packing sheets. The structured packing sheets are constructed and arranged such that the corrugations of each one of the structured packing sheets are in contact with and extend at a crossing angle to the corrugations of each adjacent one of the structured packing sheets and are configured for cross flow of a first fluid stream from one of said opposite ends to the other of said opposite ends and a second fluid stream descending from the top edge to the bottom edge of the structured packing sheets. Each structured packing sheet has an entry region at one of the opposite ends, an exit region at the other of the opposite ends, and a bulk region extending between the entry region and the exit region. The corrugations in the bulk region extend longitudinally along an inclination angle defined in relation to a horizontal axis in the range selected from the group consisting of 5 to 35 degrees, 10 to 25 degrees, 10 to 20 degrees, and 12 to 17 degrees. In one modification, at least some of the corrugations in each structured packing sheet each have multiple primary segments in the bulk region that extend longitudinally along an inclination angle defined in relation to a horizontal axis and a periodic segment between adjacent ones of the primary segments where the inclination angle passes through an inflection point such that successive ones of the primary segments are displaced in one sideways direction.

In another aspect, the present invention is directed to a structured packing module comprising a plurality of structured packing sheets positioned in an upright, parallel relationship to each other, with each structured packing sheet having opposite ends, a top edge, a bottom edge, corrugations formed of alternating peaks and valleys and corrugation sidewalls that extend between adjacent ones of the peaks and valleys, apertures on the corrugation sidewalls for allowing passage of fluid through the structured packing sheets, and raised ridges on the corrugation sidewalls. The structured packing sheets are constructed and arranged such that the corrugations of each one of the structured packing sheets are in contact with and extend at a crossing angle to the corrugations of each adjacent one of the structured packing sheets. Each structured packing sheet has an entry region at one of the opposite ends, an exit region at the other of the opposite ends, and a bulk region extending between the entry region and the exit region. At least some of the corrugations in each structured packing sheet each have multiple primary segments in the bulk region that extend longitudinally along an inclination angle defined in relation to a horizontal axis and a periodic segment between adjacent ones of the primary segments where the inclination angle passes through an inflection point such that successive ones of the primary segments are displaced in one sideways direction. The inclination angle of the primary segments of the corrugations in the bulk region is in the range selected from the group consisting of 10 to 25 degrees, 10 to 20 degrees, and 12 to 17 degrees and on each of the structured packing sheets the periodic segments are coplanar with the primary segments.

In a further aspect, the present invention is directed to a crossflow contactor for removing a component from a fluid. The crossflow contactor comprises a shell defining an open internal region in which a first fluid stream may flow from an inlet end to a horizontally opposite outlet end of the shell. One or more structured packing modules as described above are positioned in the open internal region in a flow path for the first fluid stream when it is present in the open internal region. A liquid distributor is provided for delivering a second fluid stream into the one or more structured packing modules from above to interact in the one or more structured packing modules with the first fluid stream when present in the open internal region. A liquid collector is provided for collecting and removing the second fluid steam from below the one or more structured packing modules after the interaction with the first fluid stream when present in the open internal region.

BRIEF DESCRIPTION OF THE FIGURES

In the accompanying drawings that form part of the specification and in which like reference numerals are used to indicated like components in the various views and contour lines are used to aid in the illustration of various surface features:

FIG. 16 is an end elevation view of a structured packing sheet in accordance with a twelfth embodiment of the present invention.

DETAILED DESCRIPTION OF THE PREFERRED EMBODIMENTS

Figure 1:
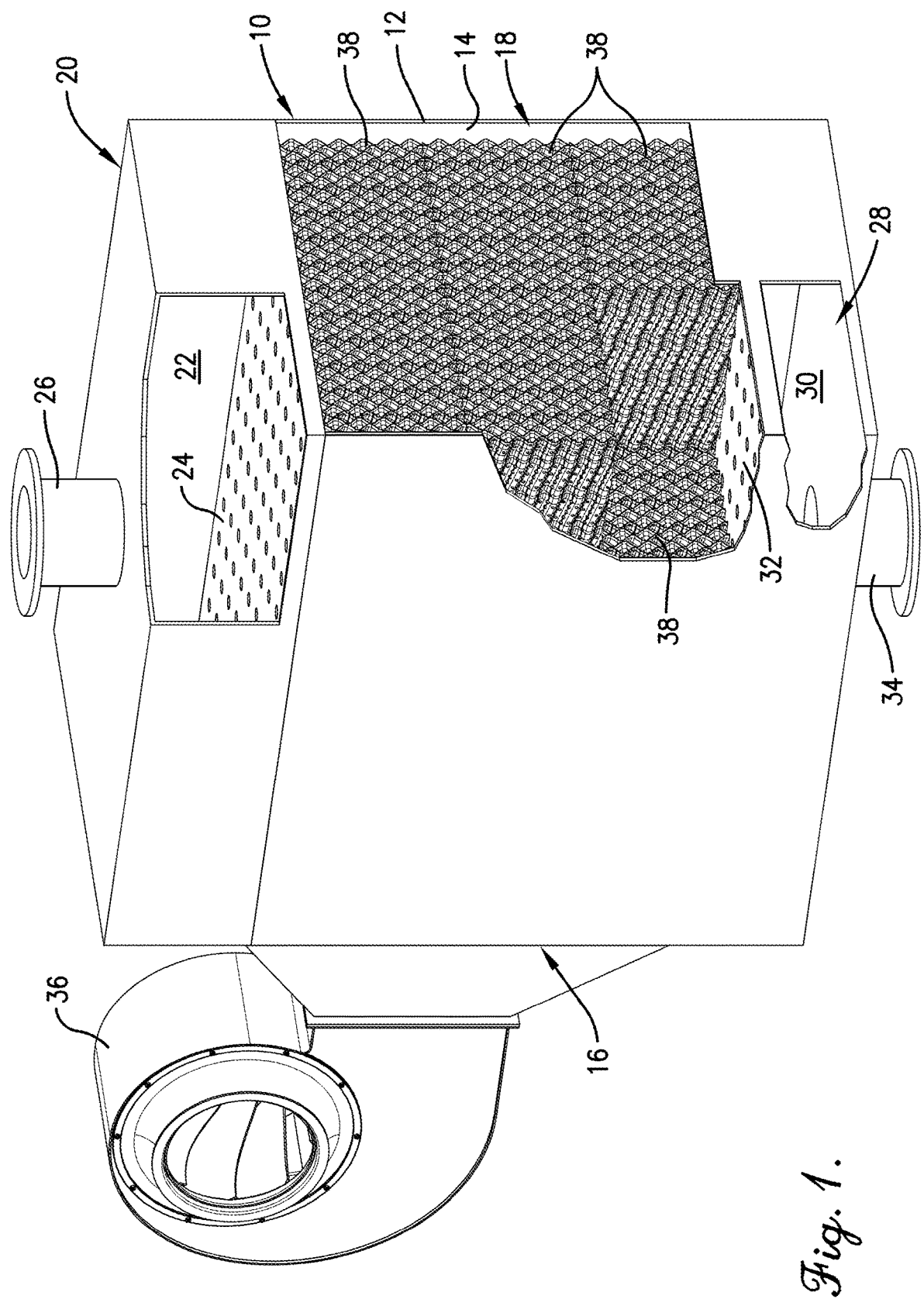
FIG. 1 is a side perspective view of a mass transfer column in the form of a crossflow contactor with portions broken away to show structured packing modules constructed in accordance with one embodiment of the present invention positioned within the crossflow contactor and other details of construction.

Turning now to the drawings in greater detail and initially to FIG. 1, a mass transfer column suitable for use in a variety of mass transfer, heat exchange, and/or reaction processes is represented generally by the numeral 10. As one specific example, the mass transfer column 10 may be a crossflow contactor that is used to remove carbon dioxide from ambient air.

The mass transfer column 10 comprises a shell 12 that defines a horizontally extending open internal region 14 for the horizontal passage of a first fluid stream from an inlet end 16 to a horizontally opposite outlet end 18 of the open internal region 14. A liquid distributor 20 is formed by the shell 12 or separately from the shell 12 for delivering a second fluid stream into the open internal region 14 from above. In the illustrated embodiment, the liquid distributor 20 comprises an upper plenum 22 positioned above and separated from the open internal region 14 by a perforated plate 24 that uniformly distributes the second fluid stream into all or a selected portion of the open internal region 14. An inlet nozzle 26 may be used to deliver the second fluid stream into the upper plenum 22 from a feedline (not shown).

A liquid collector 28 is formed by the shell 12 or separately from the shell 12 for collecting and removing the second liquid stream from below after it has interacted with the first fluid stream in the open internal region 14. In the illustrated embodiment, the liquid collector 28 comprises a lower plenum 30 positioned below and separated from the open internal region 14 by another perforated plate 32, similar to perforated plate 24 used with the liquid distributor 20, that uniformly receives the second fluid stream from all or a selection portion of the open internal region 14. An outlet nozzle 34 may be used to deliver the second fluid stream from the lower plenum 30 to a flow line (not shown). It is to be understood that the illustrated embodiments of the liquid distributor 20 and liquid collector 28 are merely exemplary embodiments and other designs may be used to deliver the second liquid stream to the open internal region 14 and to then remove it therefrom.

The mass transfer column 10 may also include any of various types of fans 36 or other pressurization means upstream from the inlet end 16 of the open internal region 14 to cause the flow of the first fluid stream through the open internal region 14 in crossflow relationship to the descending second fluid stream.

One or more structured packing modules 38 are positioned within the open internal region 14 of the mass transfer column 10 and extend across the horizontal and vertical cross section of the open internal region 14, or a portion thereof, so that the first fluid stream flows through the structured packing modules 38 with minimal opportunity for the first fluid stream to channel around the structured packing modules 38. In the illustrated embodiment, the structured packing modules 38 are vertically stacked to form multiple layers. Multiple structured packing modules 38 may be positioned end to end and side to side within each layer.

Each structured packing module 38 comprises a plurality of structured packing sheets 40 that are positioned in an upright, parallel relationship to each other. Each of the structured packing sheets 40 is constructed from a suitably rigid material, such as any of various metals, plastics, or ceramics, having sufficient strength and thickness to withstand the processing conditions experienced within the mass transfer column 10. Each of the structured packing sheets 40 presents a front and back surface, of which all, or a portion, may be generally smooth and free of surface texturing, or which may include various types of texturing, embossing, grooves, lines, or dimples. The configuration of the surfaces of the packing sheets 40 depends on the particular application in which the packing sheets 40 are to be used and may be selected to facilitate spreading and thereby maximize contact between the first and second fluid streams.

Turning now to FIGS. 2-5, each structured packing sheet 40 has opposite ends 42 and 44, a top edge 46, and a bottom edge 48. Parallel corrugations 50 are formed in the structured packing sheet 40 and comprise alternating peaks 52 and valleys 54 and corrugation sidewalls 56 that extend between adjacent ones of the peaks 52 and valleys 54. The peaks 52 on a front side of each structured packing sheet 40 form valleys 54 on an opposite or back side of the structured packing sheet 40. Likewise, valleys 54 on the front sides of each structured packing sheet 40 form peaks 52 on the back side of the structured packing sheet 40. The corrugations 50 may extend along the entire height and width of the structured packing sheet 40 and are generally of a sinusoidal cross section with rounded apices for the peaks 52 and valleys 54. In another embodiment, the corrugations 50 are of a triangular cross section.

Figure 3:
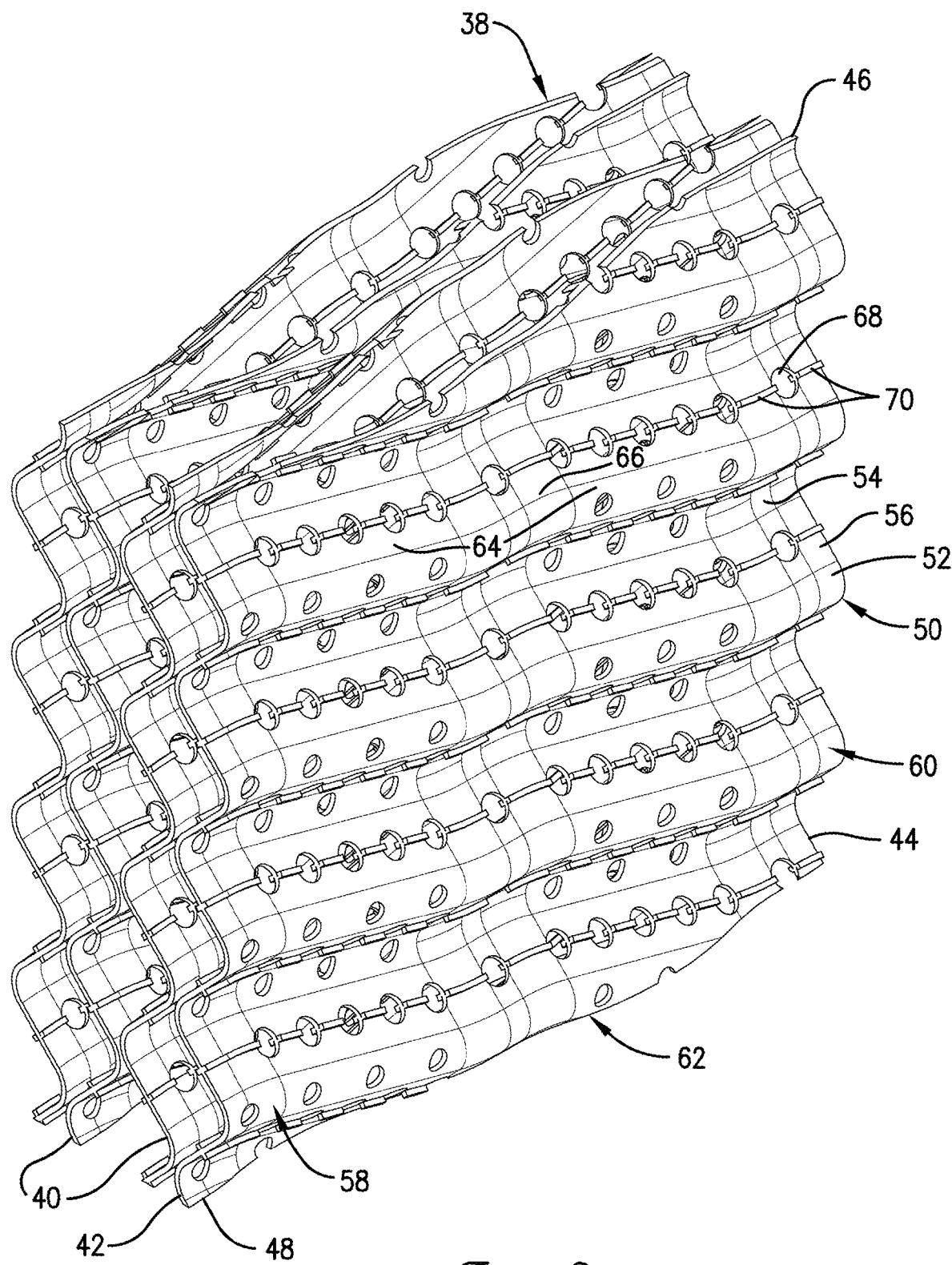
FIG. 3 is a side perspective view of a number of structured packing sheets that form a portion of one of the structured modules shown in FIG. 1.

As can be seen in FIG. 3, the structured packing sheets 40 are constructed and arranged such that the corrugations 50 of each one of the structured packing sheets are in contact with and extend at a crossing angle to the corrugations of each adjacent one of the structured packing sheets 40. Adjacent ones of the structured packing sheets 40 are positioned in facing relationship so that the front side of one of the structured packing sheets 40 faces the back side of the adjacent structured packing sheet 40. The adjacent structured packing sheets 40 are further arranged so that the corrugations 50 in each one of the structured packing sheets 40 extends in a crisscrossing, or cross-corrugated, manner to those in the adjacent one(s) of the structured packing sheets 40. As a result of this arrangement, the corrugations 50 in each one of the structured packing sheets 40 extend at an angle to the corrugations of each adjacent one of the structured packing sheets 40. All of some of the peaks 52 of the corrugations 50 of the front side of each one of the structured packing sheets 40 are in contact with the peaks 52 on the back side of the adjacent one of the structured packing sheets.

Each structured packing sheet 40 may have an entry region 58 at end 42, an exit region 60 at the opposite end 44, and a bulk region 62 extending between the entry region 58 and the exit region 60. The portion of the corrugations 50 in the entry region 58 may extend in a manner to reduce resistance of fluid flow into the entry region 58 and the portions of the corrugations 50 in the exit region 60 may likewise extend in a manner to reduce resistance of fluid flow out of the exit region 60. In one embodiment, the corrugations 50 in the entry region 58 transition from a lesser inclination angle in relation to a horizontal axis at the end 42 to a greater inclination angle as it enters the bulk region 62. Similarly, the corrugations 50 in the exit region 58 may transition within the exit region from a greater inclination angle at the boundary with the bulk region 62 to a lesser inclination angle at the opposite end 44. If the corrugations 50 are of the same construction across all of the structured packing sheet 40, rather than having higher capacity portions in entry and exit regions 58 and 60, it is to be understood that the bulk region 62 extends across all of the structured packing sheet 40.

Figure 2:
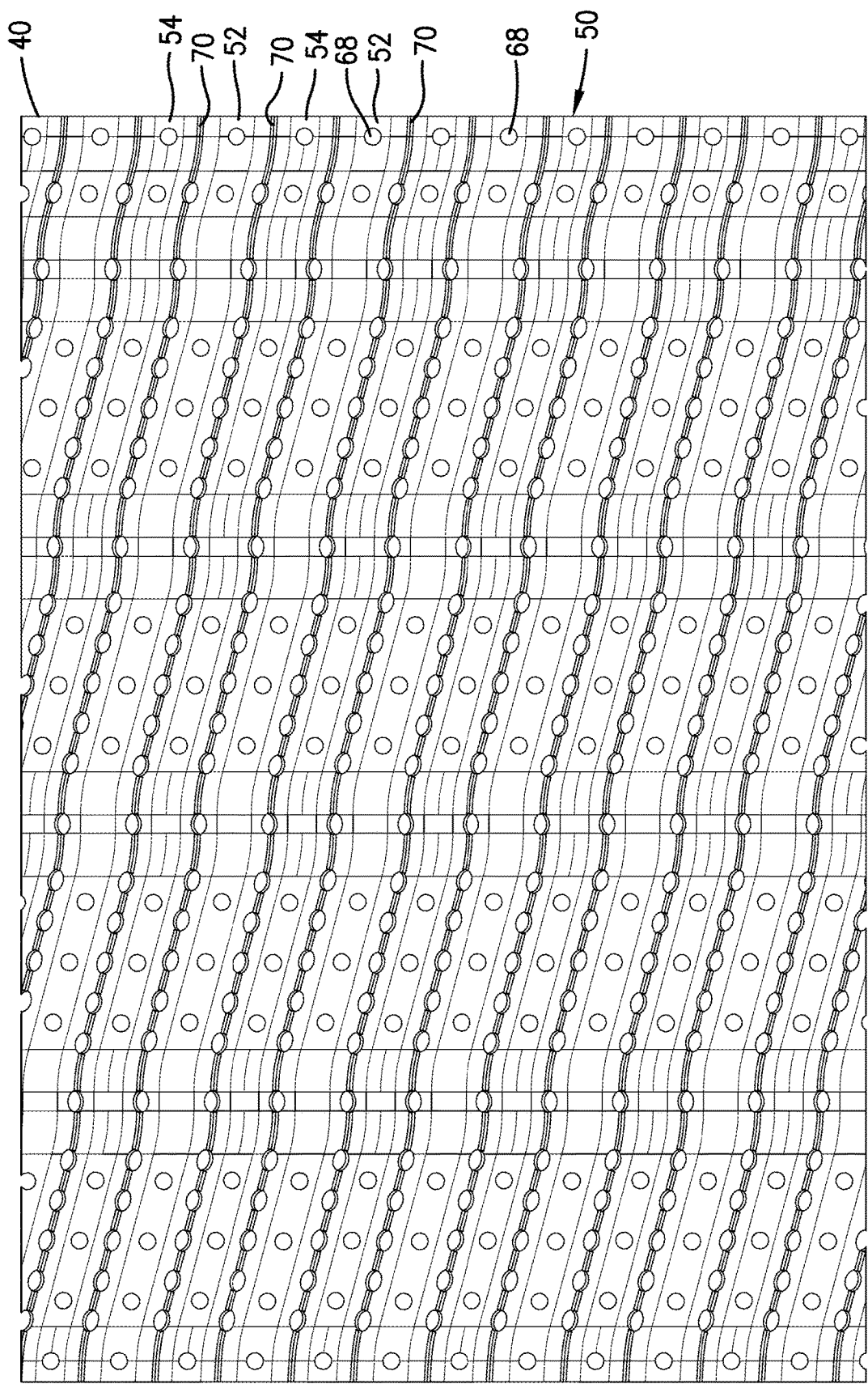
FIG. 2 is an elevation view showing one face of a single structured packing sheet used in the structured packing modules shown in FIG. 1.
Figure 4:
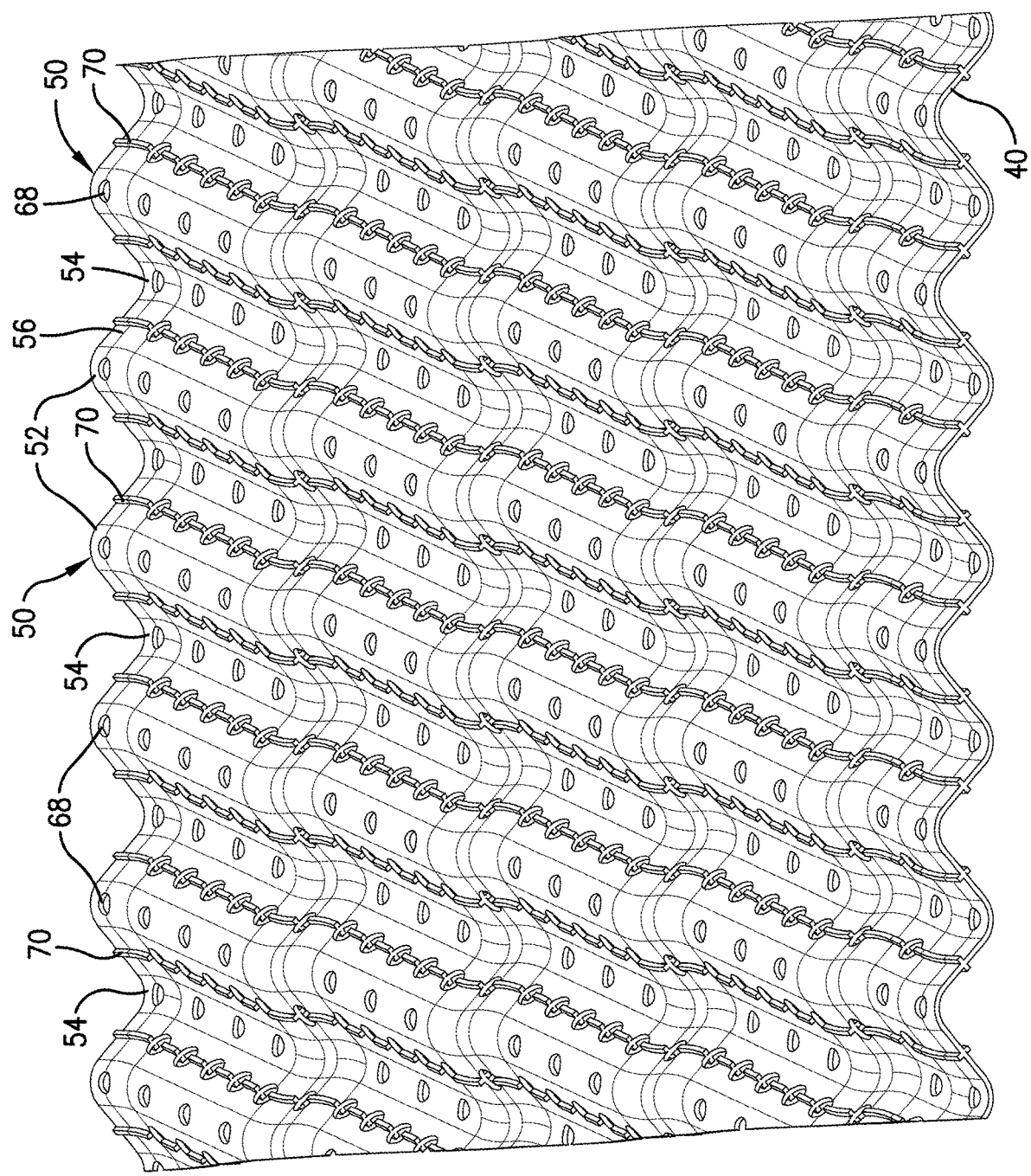
FIG. 4 is a side perspective view of one of the structured packing sheets shown in FIG. 3, but taken from a different perspective.

All or at least some of the corrugations 50 in each structured packing sheet 40 each have multiple primary segments 64 in the bulk region 62 that extend longitudinally in a straight line along an inclination angle defined in relation to the horizontal axis and a periodic segment 66 between adjacent ones of the primary segments 64 where the inclination angle passes through an inflection point such that successive ones of the primary segments 64 are displaced in one sideways direction, as can best be seen in FIG. 4. As can best be seen in FIG. 5, the primary segments 64 and the periodic segments 66 of the corrugations 50 may be coplanar such that the peak 52 of each corrugation 50 lies in the same plane along its entire length and the valley 54 of each corrugation 50 likewise lies in the same plane along its entire length. While only two of the primary segments 64 and a single one of the interposed periodic segments 66 are shown for ease of illustration in FIGS. 3 and 6-10, in other embodiments such as shown in FIGS. 1, 2 and 4, three or more of the primary segments 64 and interposed periodic segments 66 may be used. The inclination angle of the primary segments 64 of the corrugations 50 in the bulk region 62 may be in the range selected from the group consisting of 5 to 35 degrees, 10 to 25 degrees, 10 to 20 degrees, and 12 to 17 degrees. In one embodiment, the inclination angle is 15 degrees.

The corrugations 50 may be constructed so that the contact points between the corrugations 50 of adjacent ones of the structured packing sheets 40 are located solely or primarily on the primary segments 64 rather than on the periodic segments 66. The corrugations 50 may also be constructed in some embodiments so that the periodic segments 66 are offset on adjacent ones of the structured packing sheets 40. This can be achieved, as shown in FIG. 2, by spacing the periodic segments 66 at different distances from the opposite ends 42 on each structured packing sheet 40 so that adjacent structured packing sheets 40 may be flipped in relation to each during assembly of the structured packing module 38 to cause a staggered arrangement of the periodic segments 66 on adjacent ones of the structured packing sheets.

Each of the structured packing sheets 40 may be provided with a plurality of apertures 68 that extend through the structured packing sheet 40 for facilitating vapor and liquid distribution within the structured packing module 38. Each aperture 68 provides an open area for permitting the passage of fluid through the associated packing sheet 40. In some embodiments, the maximum planar dimension of the apertures 68 can be in the range of from about 1 mm to about 13 mm, about 1.5 mm to about 10 mm, about 2 mm to about 8 mm, or about 2.5 mm to about 6 mm. Although shown in the drawing figures as having a generally circular shape, the apertures 68 may have other shapes, such as a triangular shape, an oblong shape, an oval shape, a rectangular shape, or a square shape. The maximum planar dimension of each aperture 68 is measured along the longest line between two sides of the aperture 68 that passes through the center of the aperture 68. When the aperture 68 has a round shape, the maximum planar dimension is the diameter.

Figure 7:
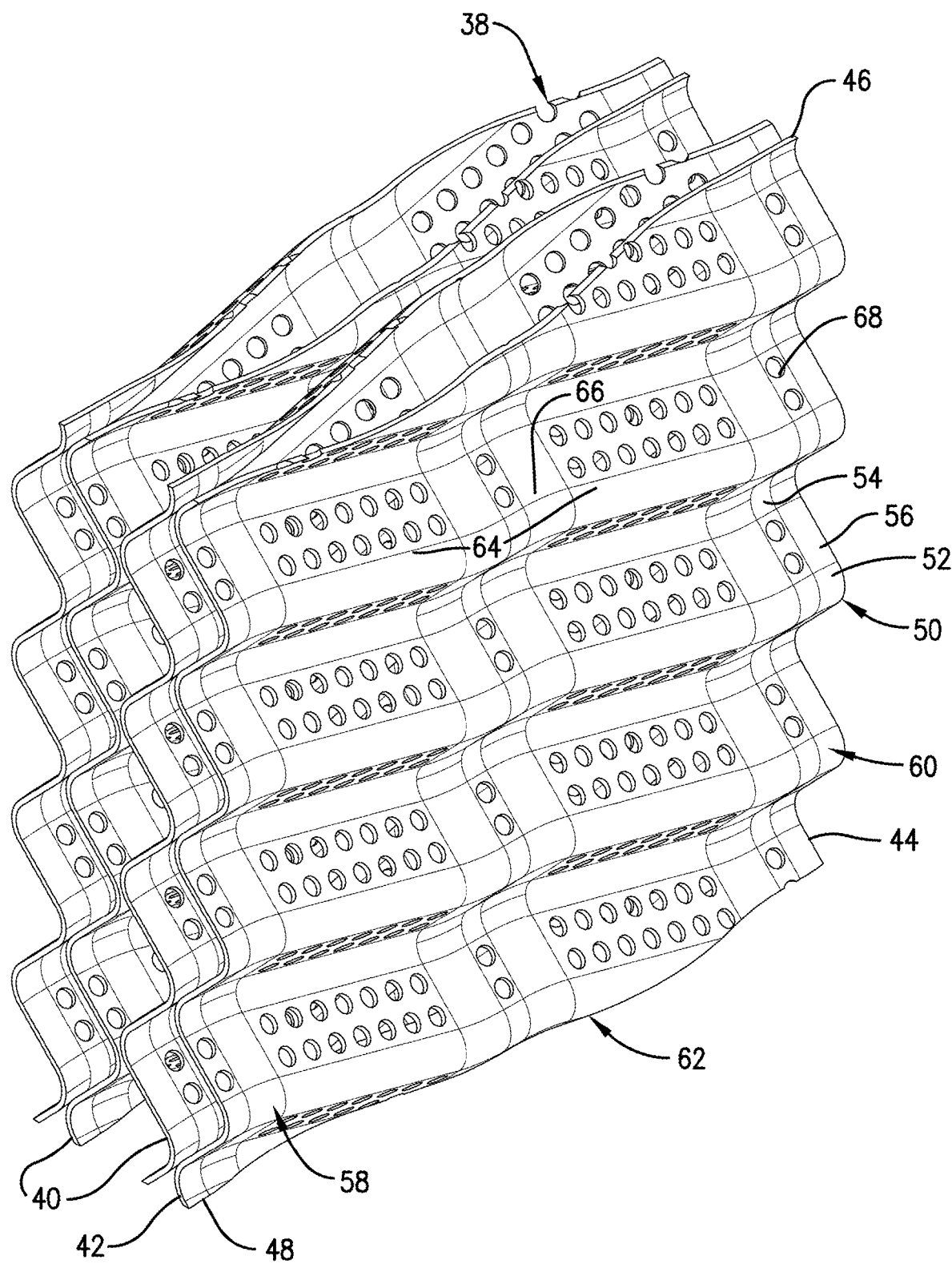
FIG. 7 is a side perspective view of a number of structured packing sheets of a third embodiment of the present invention, which are similar to the second embodiment of the structured packing sheets as shown in FIG. 6 but use two rows of apertures on each corrugation sidewall rather than the single row shown in the second embodiment.
Figure 8:
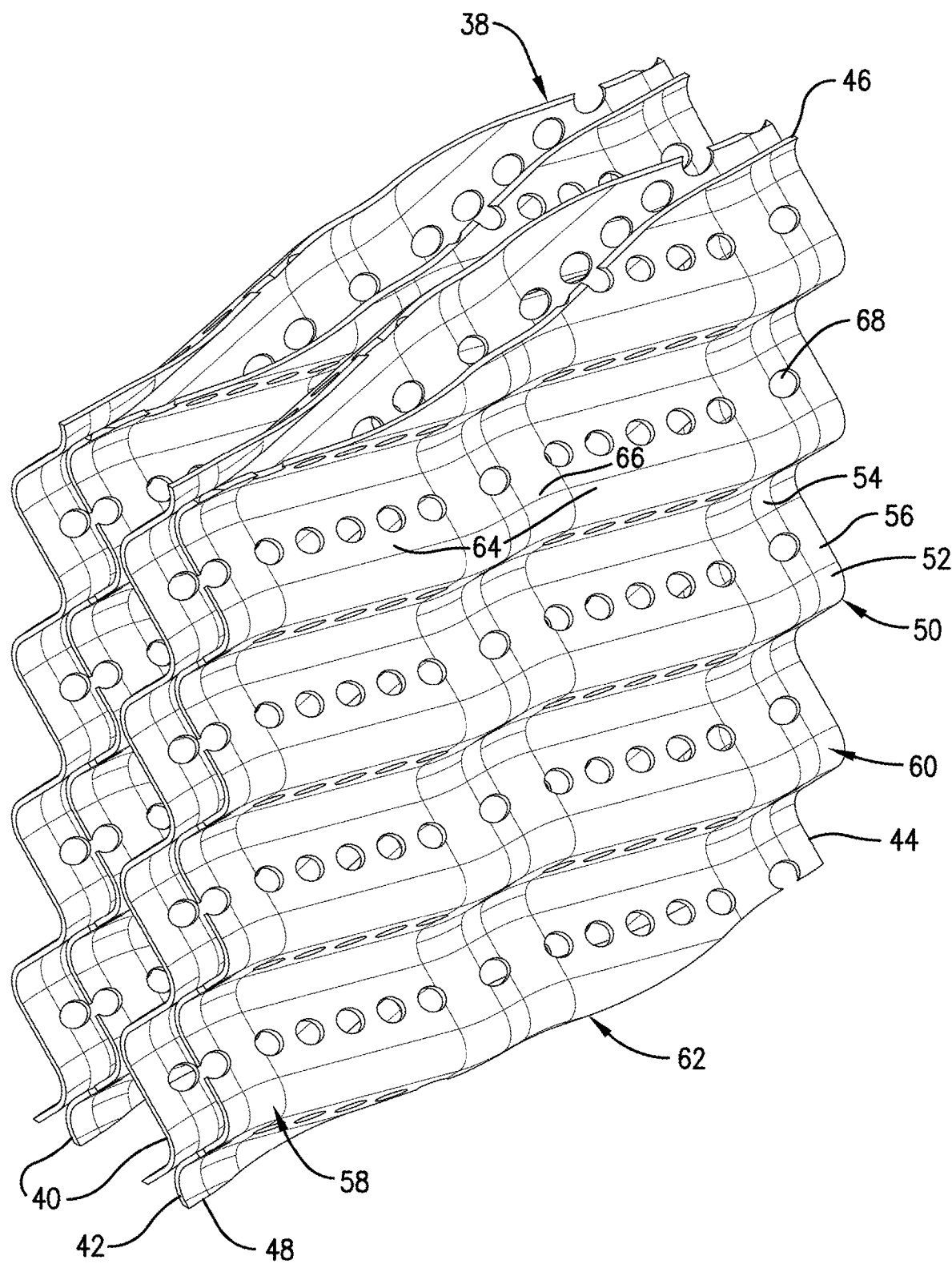
FIG. 8 is a side perspective view of a number of structured packing sheets of a fourth embodiment of the present invention, which are similar to the second embodiment of the structured packing sheets shown in FIG. 6 but use elongated apertures rather than the round apertures shown in the second embodiment.
Figure 9:
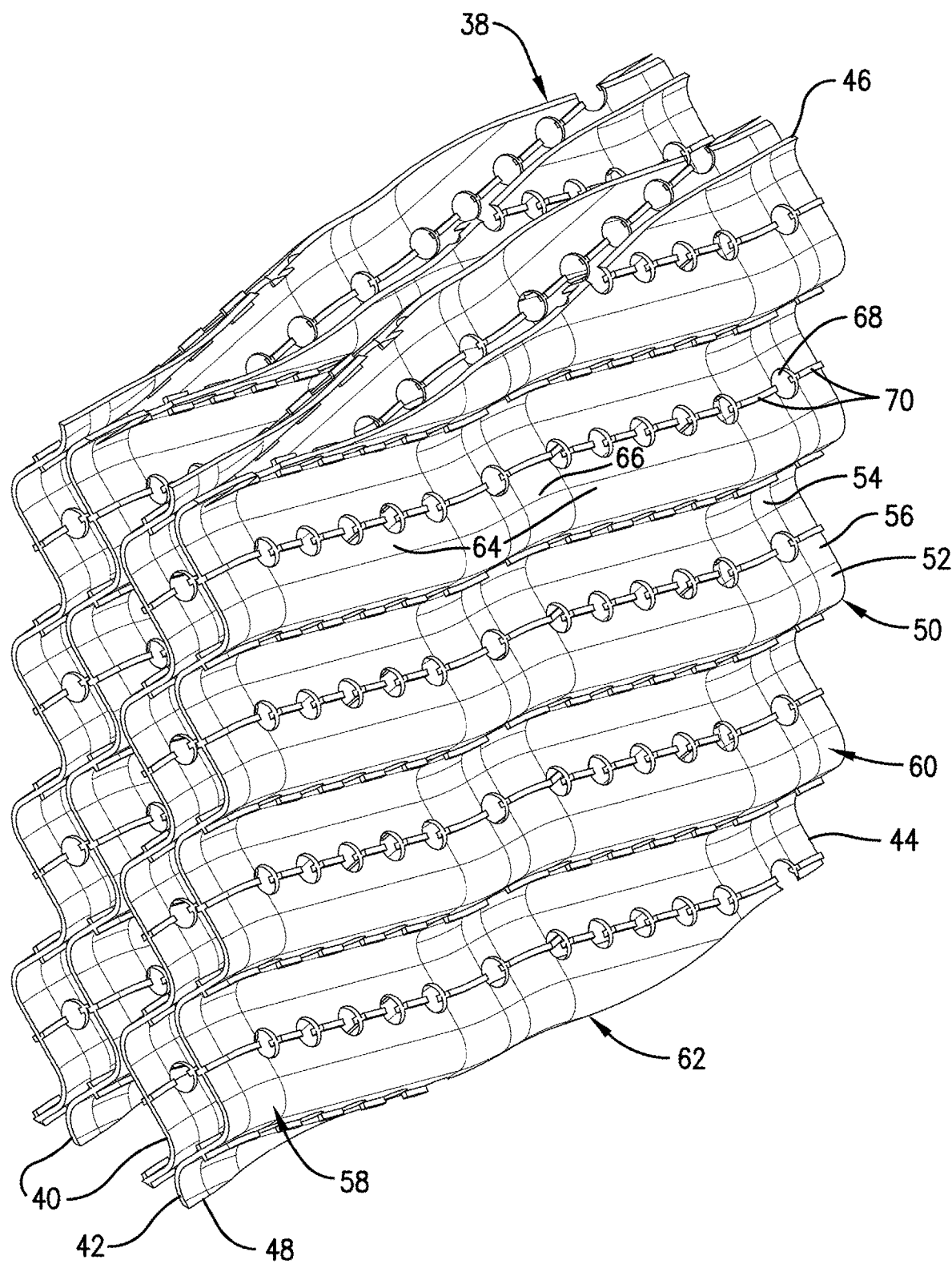
FIG. 9 is a side perspective view of a number of structured packing sheets of a fifth embodiment of the present invention, which are similar to the second embodiment of the structured packing sheets as shown in FIG. 6 but include raised ridges that extend between and connect adjacent apertures.

In some embodiments, such as shown in FIG. 7, the open area of each of the apertures 68 may be minimized such that individual apertures 68 have an open area of not more than about 80 mm2, not more than about 50 mm2, or not more than about 30 mm2, but the number of apertures 68 per unit area may be maximized so that the total open area of each of structured packing sheet 40 is in the range of from about 6 to about 20 percent, about 8 to about 18 percent, about 10 to about 16 percent, or about 11 to about 15 percent, based on the total surface area of the structured packing sheet 40. The use of large numbers of these smaller apertures 68 encourages liquid spreading on the faces of the structured packing sheet 40 and the transfer of liquid to both faces of the structured packing sheet 40.

The apertures 68 may be positioned only on the corrugation sidewalls 56, such as shown in the embodiments of FIGS. 6-10, or may additionally be included within the peaks 52 and valleys 54, such as shown in the embodiments of FIGS. 1-5 and 11. In one embodiment, such as shown in the embodiments of FIGS. 1-5 and 11, the apertures 68 are present on the corrugation sidewalls 56 and the peaks 52 and valleys 54 but are concentrated on the corrugation sidewalls 56 to minimize pressure drop in crossflow applications. In another embodiment, such as shown in the each of the embodiments of FIGS. 1-11, the apertures 68 are aligned along a center of the corrugation sidewalls 56 in one or more rows.

Figure 10:
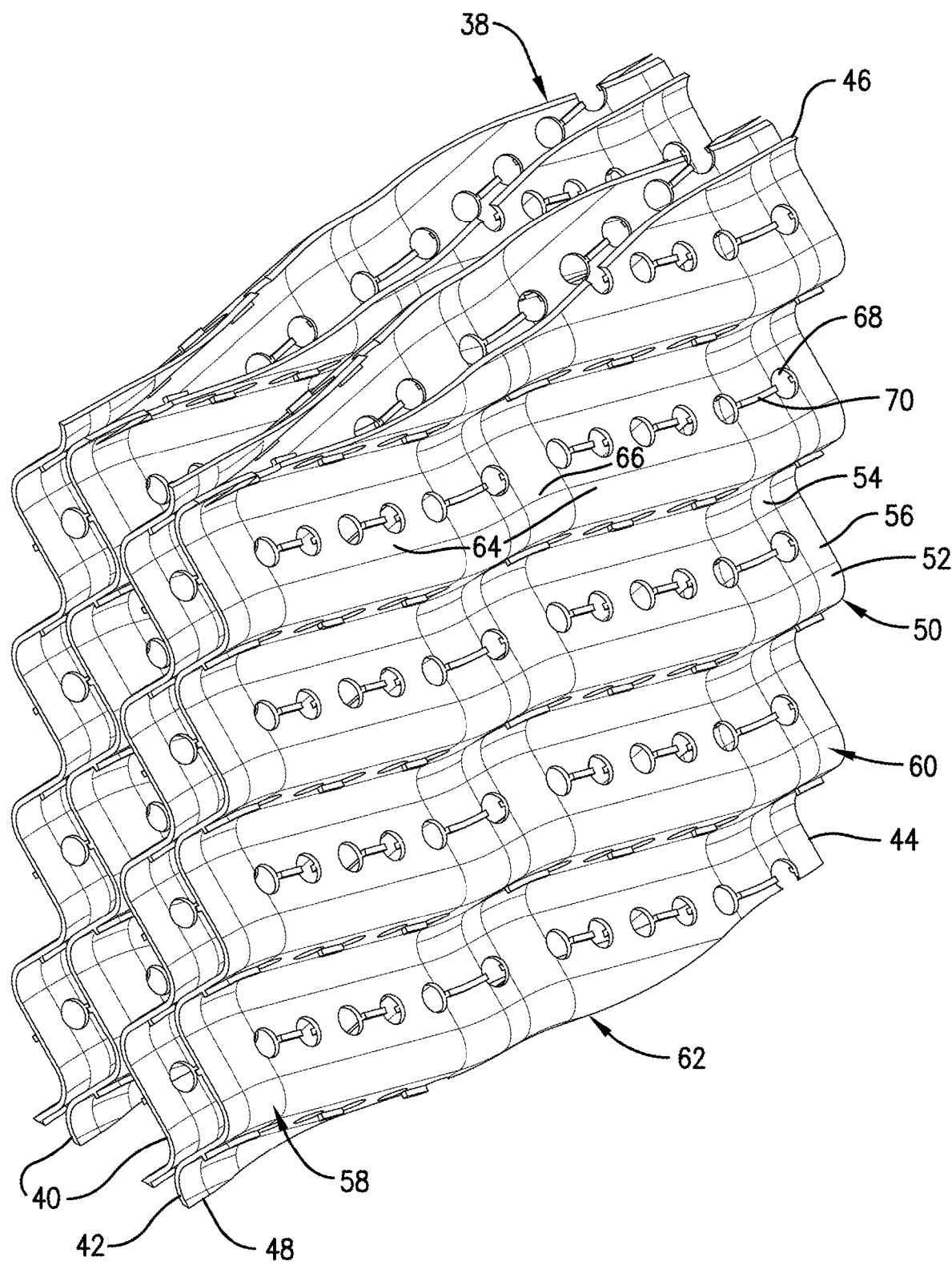
FIG. 10 is a side perspective view of a number of structured packing sheets of a sixth embodiment of the present invention, which are similar to the fifth embodiment of the structured packing sheets as shown in FIG. 9 but the raised ridges are included between only some of the adjacent apertures in a staggered arrangement on adjacent corrugation sidewalls.
Figure 11:
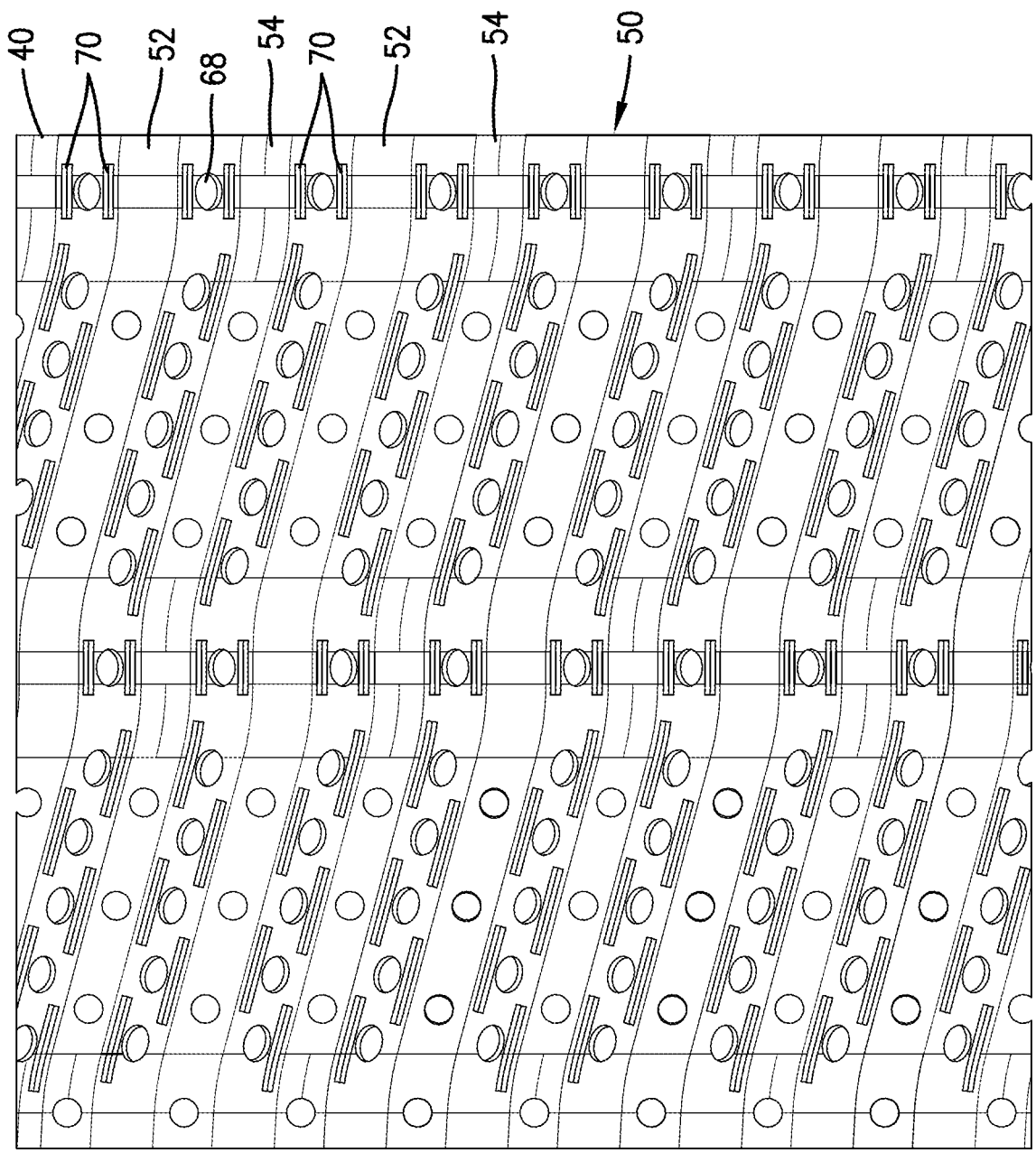
FIG. 11 is a side perspective view of a portion of a single structured packing sheet of a seventh embodiment of the present invention in which the raised ridges are discontinuous and are positioned in rows above and below the apertures rather than extending between and connecting adjacent apertures.

The structured packing sheet 40 may also comprise a plurality of raised ridges 70 on one or both faces of the structured packing sheet 40 to facilitate liquid spreading. The raised ridges 70 are elongated and, in some embodiments, such as shown in FIGS. 1-5 and 9-11, may extend generally along the inclination angle of the primary segments 64 of the corrugations 50 and may follow the contour of the periodic segments 66 of the corrugations 50. The raised ridges 70 may extend between and connect adjacent ones of some of the apertures, such as shown in FIG. 10, all of the apertures 68, such as shown in FIGS. 1-5 and 9, or none of the apertures, such as shown in FIG. 11. The raised ridges 70 may be continuous or may have periodic gaps as shown in FIG. 11 and may be staggered relative to one another, such as on adjacent ones of the corrugations sidewalls as shown in FIGS. 10 and 11. In some embodiments, as shown in FIGS. 1-5 and 9-11, the raised ridges 70 may be linear. In other embodiments, the raised ridges 70 may be undulating (not shown). In one embodiment, the raised ridges 70 may extend between 30 and 100 percent of adjacent ones of the apertures 68 on at least the front or rear face of each structured packing sheet 40. In other embodiments, the raised ridges 70 may extend between 50 and 100 percent, 75 and 100 percent, 85 and 100 percent, or 95 and 100 percent of adjacent ones of the apertures 68 on the front and or the rear face of each structured packing sheet 40.

Figure 5:
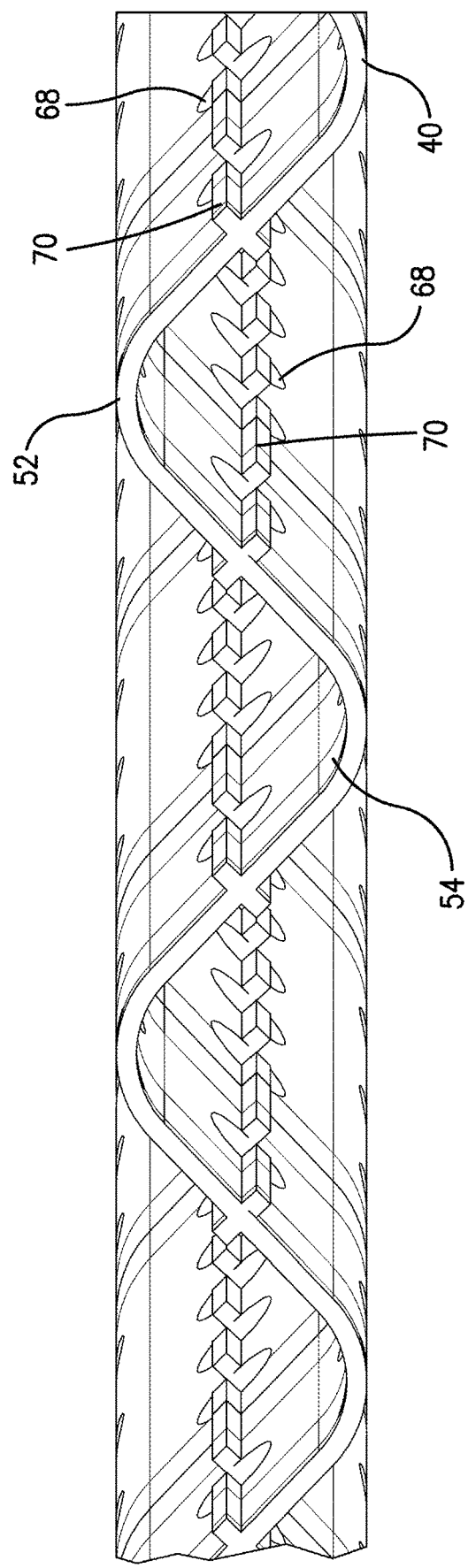
FIG. 5 is an end elevation view of the structured packing sheet shown in FIG. 4.
Figure 6:
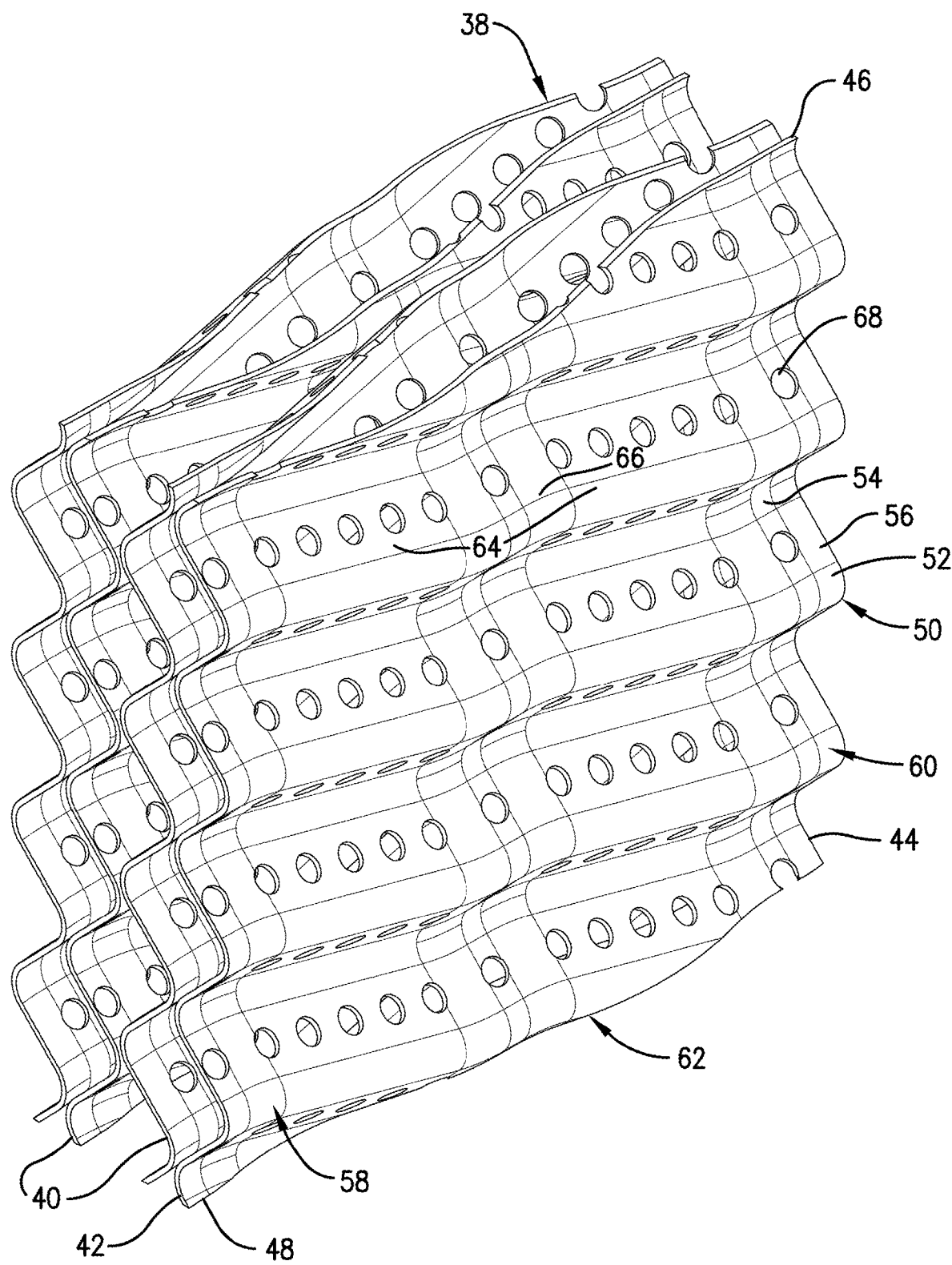
FIG. 6 is a side perspective view of a number of structured packing sheets of a second embodiment of the present invention, which are similar to the first embodiment of the structured packing sheets as shown in FIG. 3 but lack the raised ridges that extend between and connect adjacent apertures in the first embodiment and apertures on the peaks and valleys shown in FIG. 3.
Figure 12:
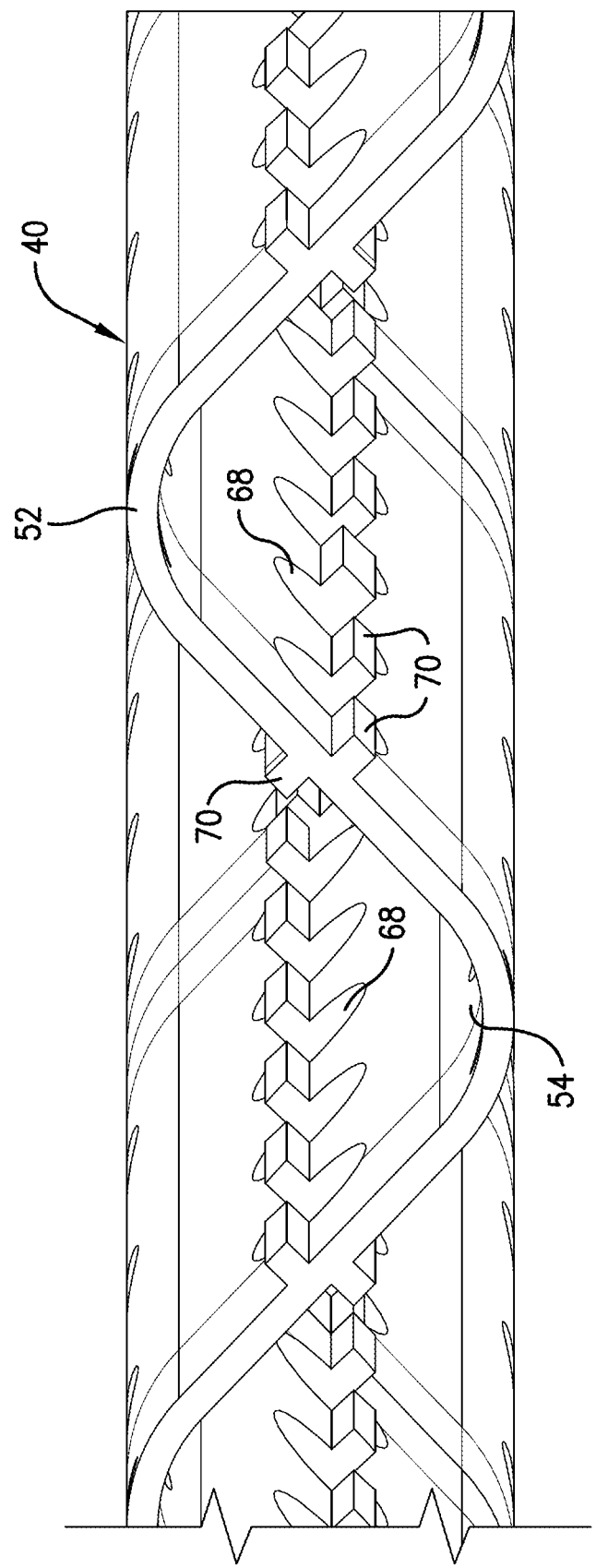
FIG. 12 is an end elevation view of a structured packing sheet in accordance with an eighth embodiment of the present invention.
Figure 13:
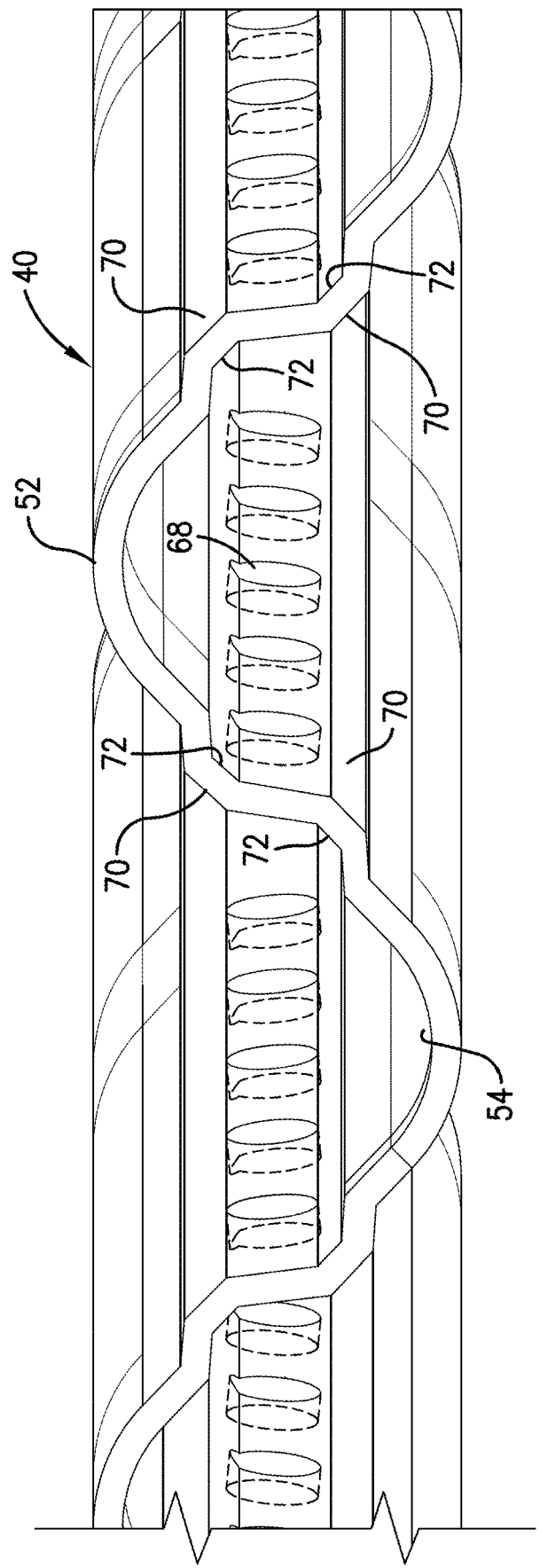
FIG. 13 is an end elevation view of a structured packing sheet in accordance with a ninth embodiment of the present invention.
Figure 14:
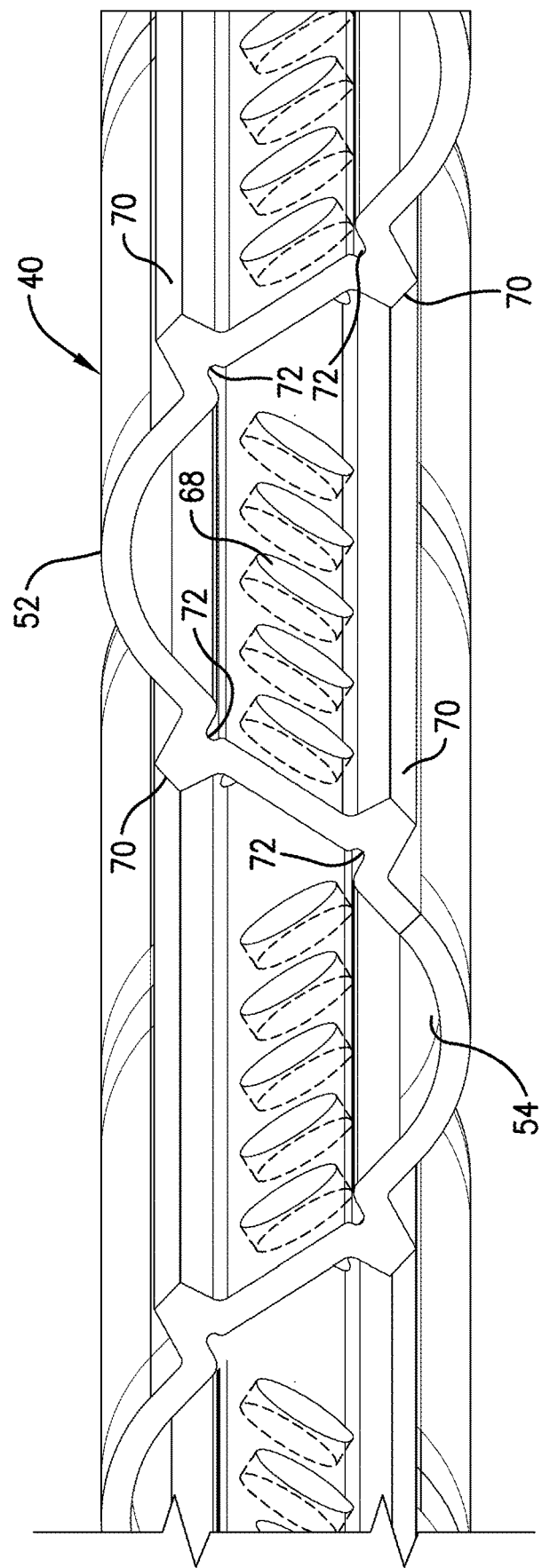
FIG. 14 is an end elevation view of a structured packing sheet in accordance with a tenth embodiment of the present invention.
Figure 15:
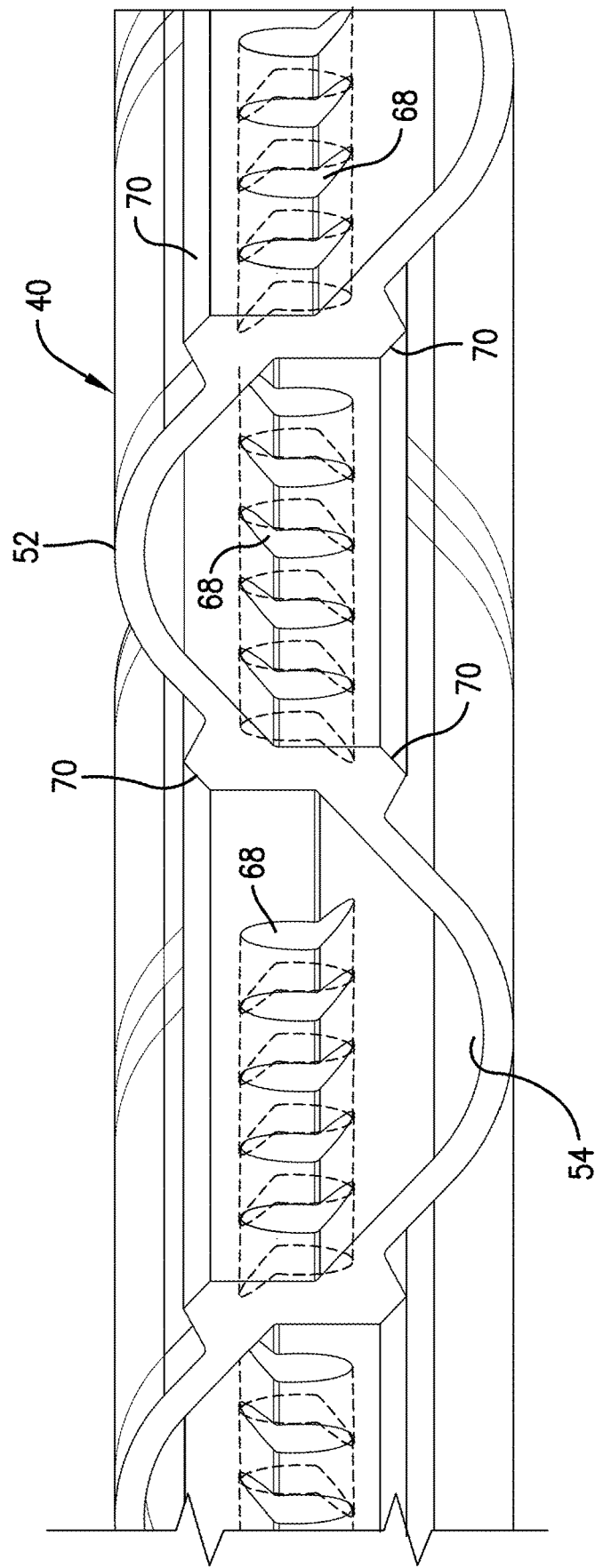
FIG. 15 is an end elevation view of a structured packing sheet in accordance with an eleventh embodiment of the present invention.

The ridges 70 on opposite faces of the structured packing sheet 40 sheet may be aligned with one another, as shown in FIG. 5, or they may be offset, as shown in FIG. 12. When the ridges 70 are offset on opposite faces of the structure packing sheet 40, the face of the structured packing sheet 40 that is opposite from the ridge 70 may include a depression or valley 72 underlying the ridge 70, as shown in FIGS. 13-16. The cross-sectional profile of the ridges 70 may vary and includes a rectangular cross section, such as the square cross section shown in FIG. 12. In other embodiments, such as shown in FIGS. 13-16, the ridges 70 may be formed by angled or beveled walls on one or both sides, rounded portions, and curves. The ridges 70 may also be formed as a series of smooth, intersecting curves without the gap between the curves that is shown in FIG. 16. The wall forming one side of the ridge 70 may be longer than the wall forming the other side of the ridge 70, such as shown in FIG. 15, which allows the portions of the corrugations 50 on opposite sides of the ridge 70 to be displaced so that they are in different planes.

It is believed that constructing the corrugations 50 with the sideways offset primary segments 64 and the interposed periodic segments 66 in which the inclination angle passes through an inflection point, create flow channels for the first fluid that yield a good mass transfer coefficient while minimizing pressure drop. Structured packing modules 38 comprising the structured packing sheets 40 in which the apertures 68 lie along the centerline of the corrugation sidewalls 56, raised ridges 70 extend between and connect adjacent ones of the apertures 68, and in which a 15 degree inclination angle was used for the primary segments 64 of the corrugations 50 have demonstrated improved mass transfer and pressure drop performance in comparison to commercially available products when removing carbon dioxide from air using a carbon dioxide solvent in a crossflow arrangement.

The mass transfer column 10 incorporating the structured packing modules 38 is well suited for operation as a crossflow contactor for removal of acid gases, such as carbon dioxide, hydrogen sulfide or sulfur dioxide, from ambient air or gaseous streams. In operation, the fan 36 directs the ambient air as the first fluid stream horizontally through the open internal region 14 for flow through the structured packing modules 38. The liquid distributor 20 directs the lean solvent for the carbon dioxide or other acid gas as the second fluid stream into the structured packing modules 38 from above. The crossflow of the air (or other gaseous stream) and solvent through the structured packing modules 38 causes the carbon dioxide or other acid gas in the first fluid stream to become solubilized in the solvent. The rich solvent is then collected and removed by the liquid collector 28.

From the foregoing, it will be seen that this invention is one well adapted to attain all the ends and objectives hereinabove set forth, together with other advantages that are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:
1. A structured packing module comprising:
   a plurality of structured packing sheets positioned in an upright, parallel relationship to each other,
   each structured packing sheet having opposite ends, a top edge, a bottom edge, corrugations formed of alternating peaks and valleys and corrugation sidewalls that extend between adjacent ones of the peaks and valleys, and apertures in the corrugations for allowing passage of fluid through the structured packing sheets, the structured packing sheets being constructed and arranged such that the corrugations of each one of the structured packing sheets are in contact with and extend at a crossing angle to the corrugations of each adjacent one of the structured packing sheets and are configured for cross flow of a first fluid stream from one of said opposite ends to the other of said opposite ends and a second fluid stream descending from the top edge to the bottom edge of the structured packing sheets, each structured packing sheet having an entry region at one of the opposite ends, an exit region at the other of the opposite ends, and a bulk region extending between the entry region and the exit region, and the corrugations in the bulk region extending longitudinally along an inclination angle defined in relation to a horizontal axis in the range selected from the group consisting of 5 to 35 degrees, 10 to 25 degrees, 10 to 20 degrees, and 12 to 17 degrees, wherein at least some of the corrugations in each structured packing sheet each having multiple primary segments in the bulk region that extend longitudinally in a straight line along the inclination angle and a periodic segment between adjacent ones of the primary segments where the inclination angle passes through an inflection point such that successive ones of the primary segments are displaced in one sideways direction, wherein the peaks and valleys of the corrugations have rounded apices in the primary segments and in the periodic segment.

2. The structured packing module of claim 1, wherein the apertures are on the corrugation sidewalls.

3. The structured packing module of claim 2, wherein the apertures are on the corrugation sidewalls and on the peaks and valleys.

4. The structured packing module of claim 2, including raised ridges on the corrugations.

5. The structured packing module of claim 2, wherein the corrugations in the entry region extend in a manner to reduce resistance of fluid flow into the entry region and the corrugations in the exit region extend in a manner to reduce resistance of fluid flow out of the exit region.

6. The structured packing module of claim 2, wherein in each of the structured packing sheets the periodic segments are coplanar with the primary segments.

7. The structured packing module of claim 2, wherein the periodic segments are offset on adjacent ones of the structured packing sheets to cause a staggered arrangement of the periodic segments on the adjacent ones of the structured packing.

8. The structured packing module of claim 7, including raised ridges on the corrugation sidewalls.

9. The structured packing module of claim 8, wherein the raised ridges extend between and connect at least some adjacent ones of the apertures.

10. The structured packing module of claim 8, wherein the raised ridges are linear or undulating and the first fluid stream and second fluid stream are in said crossflow within the structured packing module.

11. The structured packing module of claim 10, wherein the apertures are aligned along a center of the corrugation sidewalls.

12. A crossflow contactor for removing a component from a fluid, said crossflow contactor comprising:

a shell defining an open internal region in which a first fluid stream may flow from an inlet end to a horizontally opposite outlet end of the shell;

one or more structured packing modules of claim 1 positioned in the open internal region in a flow path for the first fluid stream when present in the open internal region;

a liquid distributor for delivering a second fluid stream into the one or more structured packing modules from above to interaction in the one or more structured packing modules with the first fluid stream is present in the open internal region; and a liquid collector for collecting and removing the second fluid steam from below the one or more structured packing modules after the interaction with the first fluid stream when present in the open internal region.

13. The crossflow contactor of claim 12, including a fan at the inlet end of the shell for blowing the first fluid stream, when present, along the flow path and through the one or more structured packing modules.

14. A structured packing module comprising:

a plurality of structured packing sheets positioned in an upright, parallel relationship to each other, each structured packing sheet having opposite ends, a top edge, a bottom edge, corrugations formed of alternating peaks and valleys and corrugation sidewalls that extend between adjacent ones of the peaks and valleys, apertures in the corrugations on the corrugation sidewalls for allowing passage of fluid through the structured packing sheets, and raised ridges on the corrugations, wherein at least some of the raised ridges extend between and connect at least some adjacent ones of the apertures, the structured packing sheets being constructed and arranged such that the corrugations of each one of the structured packing sheets are in contact with and extend at a crossing angle to the corrugations of each adjacent one of the structured packing sheets and are configured for cross flow of a first fluid stream from one of said opposite ends to the other of said opposite ends and a second fluid stream descending from the top edge to the bottom edge of the structured packing sheets, each structured packing sheet having an entry region at one of the opposite ends, an exit region at the other of the opposite ends, and a bulk region extending between the entry region and the exit region, and the corrugations in the bulk region extending longitudinally along an inclination angle defined in relation to a horizontal axis in the range selected from the group consisting of 5 to 35 degrees, 10 to 25 degrees, 10 to 20 degrees, and 12 to 17 degrees, wherein at least some of the corrugations in each structured packing sheet each having multiple primary segments in the bulk region that extend longitudinally along the inclination angle and a periodic segment between adjacent ones of the primary segments where the inclination angle passes through an inflection point such that successive ones of the primary segments are displaced in one sideways direction.

15. A structured packing module comprising:

a plurality of structured packing sheets positioned in an upright, parallel relationship to each other, each structured packing sheet having opposite ends, a top edge, a bottom edge, corrugations formed of alternating peaks and valleys and corrugation sidewalls that extend between adjacent ones of the peaks and valleys, apertures on the corrugation sidewalls for allowing passage of fluid through the structured packing sheets, and raised ridges on the corrugation sidewalls, the structured packing sheets being constructed and arranged such that the corrugations of each one of the structured packing sheets are in contact with and extend at a crossing angle to the corrugations of each adjacent one of the structured packing sheets, each structured packing sheet having an entry region at one of the opposite ends, an exit region at the other of the opposite ends, and a bulk region extending between the entry region and the exit region, and at least some of the corrugations in each structured packing sheet each having multiple primary segments in the bulk region that extend longitudinally in a straight line along an inclination angle defined in relation to a horizontal axis and a periodic segment between adjacent ones of the primary segments where the inclination angle passes through an inflection point such that successive ones of the primary segments are displaced in one sideways direction, wherein the inclination angle of the primary segments of the corrugations in the bulk region is in the range selected from the group consisting of 10 to 25 degrees, 10 to 20 degrees, and 12 to 17 degrees, wherein in each of the structured packing sheets the periodic segments are coplanar with the primary segments, wherein the peaks and valleys of the corrugations have rounded apices in the primary segments and in the periodic segment.

16. The structured packing module of claim 15, wherein the corrugations in the entry region extend in a manner to reduce resistance of fluid flow into the entry region and the corrugations in the exit region extend in a manner to reduce resistance of fluid flow out of the exit region.

17. A structured packing module comprising:
a plurality of structured packing sheets positioned in an upright, parallel relationship to each other,
each structured packing sheet having opposite ends, a top edge, a bottom edge, corrugations formed of alternating peaks and valleys and corrugation sidewalls that extend between adjacent ones of the peaks and valleys, apertures on the corrugation sidewalls for allowing passage of fluid through the structured packing sheets, and raised ridges on the corrugation sidewalls, wherein at least some of the raised ridges extend between and connect at least some adjacent ones of the apertures,
the structured packing sheets being constructed and arranged such that the corrugations of each one of the structured packing sheets are in contact with and extend at a crossing angle to the corrugations of each adjacent one of the structured packing sheets,
each structured packing sheet having an entry region at one of the opposite ends, an exit region at the other of the opposite ends, and a bulk region extending between the entry region and the exit region, and
at least some of the corrugations in each structured packing sheet each having multiple primary segments in the bulk region that extend longitudinally along an inclination angle defined in relation to a horizontal axis and a periodic segment between adjacent ones of the primary segments where the inclination angle passes through an inflection point such that successive ones of the primary segments are displaced in one sideways direction,
wherein the inclination angle of the primary segments of the corrugations in the bulk region is in the range selected from the group consisting of 10 to 25 degrees, 10 to 20 degrees, and 12 to 17 degrees,
wherein in each of the structured packing sheets the periodic segments are coplanar with the primary segments.

18. The structured packing module of claim 17, wherein the raised ridges are linear or undulating and the first fluid stream and second fluid stream are in said crossflow within the structured packing module.

19. A crossflow contactor for removing a component from a fluid, said crossflow contactor comprising:
a shell defining an open internal region in which a first fluid stream may flow from an inlet end to a horizontally opposite outlet end of the shell;
one or more structured packing modules positioned in the open internal region in a flow path for the first fluid stream when present in the open internal region and comprising:
a plurality of structured packing sheets positioned in an upright, parallel relationship to each other,
each structured packing sheet having opposite ends, a top edge, a bottom edge, corrugations formed of alternating peaks and valleys and corrugation sidewalls that extend between adjacent ones of the peaks and valleys, and apertures in the corrugations for allowing passage of fluid through the structured packing sheets,
the structured packing sheets being constructed and arranged such that the corrugations of each one of the structured packing sheets are in contact with and extend at a crossing angle to the corrugations of each adjacent one of the structured packing sheets and are configured for cross flow of a first fluid stream from one of said opposite ends to the other of said opposite ends and a second fluid stream descending from the top edge to the bottom edge of the structured packing sheets,
each structured packing sheet having an entry region at one of the opposite ends, an exit region at the other of the opposite ends, and a bulk region extending between the entry region and the exit region, and
the corrugations in the bulk region extending longitudinally along an inclination angle defined in relation to a horizontal axis in the range selected from the group consisting of 5 to 35 degrees, 10 to 25 degrees, 10 to 20 degrees, and 12 to 17 degrees,
wherein at least some of the corrugations in each structured packing sheet each having multiple primary segments in the bulk region that extend longitudinally in a straight line along the inclination angle and a periodic segment between adjacent ones of the primary segments where the inclination angle passes through an inflection point such that successive ones of the primary segments are displaced in one sideways direction,
wherein the corrugations in the entry region extend in a manner to reduce resistance of fluid flow into the entry region and the corrugations in the exit region extend in a manner to reduce resistance of fluid flow out of the exit region and including raised ridges on the corrugations, wherein at least some of the raised ridges extend between and connect adjacent ones of the apertures;
a liquid distributor for delivering a second fluid stream into the one or more structured packing modules from above to interaction in the one or more structured packing modules with the first fluid stream is present in the open internal region;

a liquid collector for collecting and removing the second
fluid steam from below the one or more structured
packing modules after the interaction with the first fluid
stream when present in the open internal region; and
a fan at the inlet end of the shell for blowing the first fluid
stream, when present, along the flow path and through
the one or more structured packing modules.

* * * * *